United States Patent [19]

Teraoku et al.

[11] 4,361,254
[45] Nov. 30, 1982

[54] HOPPER FOR STORING FREE FLOWING SOLID MATERIAL

[75] Inventors: Hiroshi Teraoku; Hideki Yamaguchi, both of Tokyo, Japan

[73] Assignees: Hitachi Ltd., Tokyo; Ohbayashi-Gumi, Ltd., Osaka, both of Japan

[21] Appl. No.: 208,479

[22] Filed: Nov. 19, 1980

[30] Foreign Application Priority Data

Nov. 21, 1979 [JP] Japan .................................. 54-150050
Feb. 14, 1980 [JP] Japan .................................. 55-16994

[51] Int. Cl.³ .................................................. B65G 65/48
[52] U.S. Cl. ..................................... 222/196; 222/410;
   222/559; 141/331; 414/325; 52/197; 222/342
[58] Field of Search ............... 222/196, 199, 478, 200,
   222/201, 221, 233, 410, 564, 559, 545, 342;
   52/192, 195, 197; 414/288, 325, 304; 141/331;
   193/29

[56] References Cited

U.S. PATENT DOCUMENTS 2,393,893  1/1946  Evans et al. ...................... 222/478
3,399,771  9/1968  Hryniowski ...................... 222/199
3,877,587  4/1975  Ishizaki ............................ 222/410

FOREIGN PATENT DOCUMENTS 882076  7/1953  Fed. Rep. of Germany ...... 414/288

Primary Examiner—H. Grant Skaggs
Attorney, Agent, or Firm—Wenderoth, Lind & Ponack

[57] ABSTRACT

A hopper includes a peripheral side wall having upper and lower open ends, and a conical body provided inside the peripheral side wall to define an annular space for storing solid material therebetween. The lower open end of the peripheral wall is separated from the conical body to define an annular discharge point therebetween.

7 Claims, 10 Drawing Figures

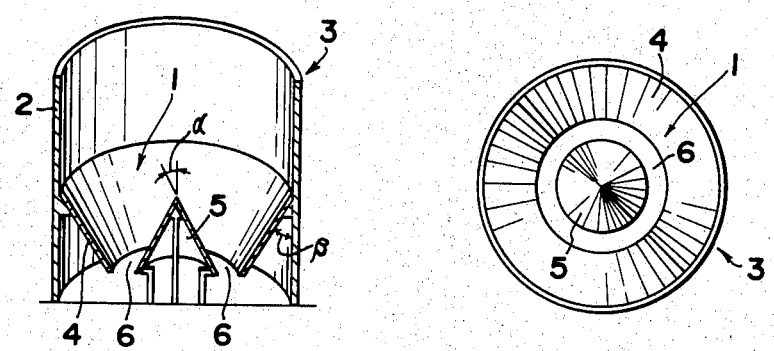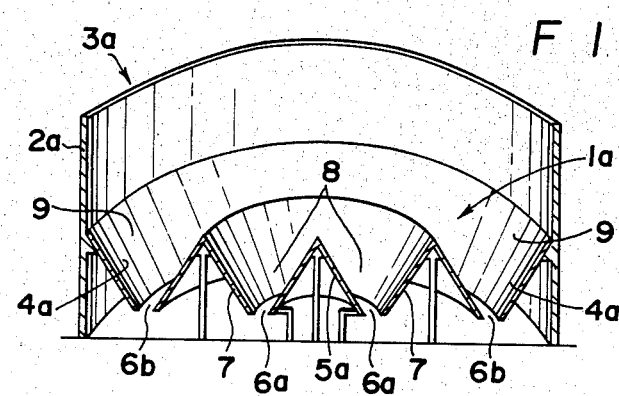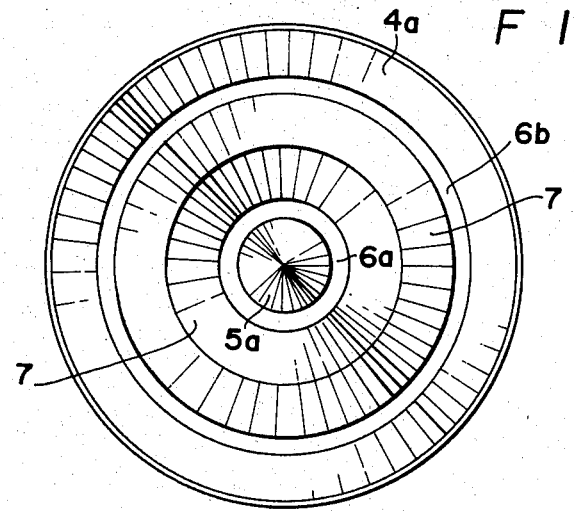

HOPPER FOR STORING FREE FLOWING SOLID MATERIAL

BACKGROUND OF THE INVENTION

This invention relates to an improvement of a hopper for storing free flowing solid material such as coal, coke or other mineral materials and discharging the stocked material from the bottom thereof when desired.

A conventional hopper of the type set forth above has a substantially inverted conical shape so as to discharge the stocked material from a bottom circular center hole thereof. The tapered peripheral wall of the hopper has a predetermined angle relative to a vertical axis thereof, the degree of inclination of which is determined in accordance with the properties of the material to be stocked in the hopper to allow free flow of the stocked material to the bottom of the hopper.

However, in the conventional hopper, in spite of such inclination of the peripheral wall of the hopper, the stocked material often forms a dome-shaped bridge over the bottom center hole of the hopper during the discharge of the stocked material therefrom. Such dome-shaped bridge prevents any further discharge of the stocked material through the bottom center hole of the hopper. Accordingly, it has been required to break the dome-shaped bridge in the hopper by using a special expensive device or by troublesome manual operation.

Furthermore, it is a recent tendency that the size of a hopper of the type set forth above becomes larger and larger due to necessity of storing a great amount of the material with reduced stock cost. When a hopper having a large diameter is constructed, the height of the hopper is increased in a natural way due to the predetermined inclination of the peripheral wall of the hopper, which will result in the increase of a dead space below the hopper. In addition, the enlargement in scale of the hopper will require a stronger supporting structure for the hopper. Thus, the enlargement of the conventional hopper will not provide any scale merit at all.

Accordingly, an object of the present invention is to provide an improved hopper which will eliminate the above disadvantages.

Another object of the present invention is to provide an improved hopper in which solid material stocked in the hopper can be discharged continuously without being blocked by a bridge of the stocked material.

A further object of the present invention is to provide an improved hopper which is relatively low in structure and does not require a strong support for the hopper.

A still further object of the present invention is to provide an improved hopper which can easily control the amount of solid material to be discharged from the hopper.

SUMMARY OF THE INVENTION

According to the present invention, there is provided a hopper for storing free flowing solid material and which comprises a peripheral side wall having upper and lower open ends, and a conical body provided inside the peripheral side wall to define an annular space for storing solid material therebetween, the lower open end of the peripheral wall being separated from the conical body to define an annular discharge port therebetween.

Preferably, the peripheral side wall of the hopper has an inverted frusto-conical shape.

Also, it is preferable to provide a device for controlling the amount of solid material to be discharged from the annular discharge port. The control device has an annular gate member provided around the discharge port to be moved up and down.

In another preferred structure, the degree of inclination of the tapered surface of the conical body relative to the vertical plane in section is smaller than that of the peripheral side wall of the inverted frusto-conical shape.

Other objects and features of the present invention will become apparent from the following detailed description of preferred embodiments of the present invention when taken in conjunction with the accompanying drawings thereof, in which:

BRIEF DESCRIPTION OF THE DRAWINGS

FIG. 1 is a schematic sectional front view showing a hopper according to a first embodiment of the present invention.

FIG. 2 is a plan view of the hopper shown in FIG. 1,

FIG. 3 is a schematic sectional front view showing a hopper according to a second embodiment of the present invention.

FIG. 4 is a plan view of the hopper shown in FIG. 3.

DETAILED DESCRIPTION OF THE INVENTION

Figure 5:
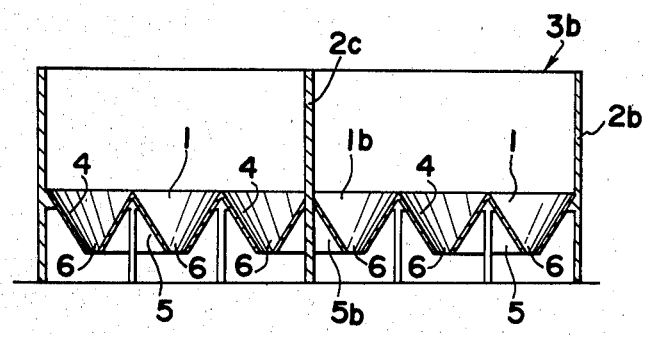
FIG. 5 is a schematic sectional front view showing a silo constructed by employing hoppers according to the first embodiment of the present invention.

Referring now to a first embodiment of the present invention shown in FIGS. 1 and 2, a hopper 1 of the present invention is provided in a cylindrical housing 2 of a silo 3. The hopper 1 has a peripheral side wall 4 of an inverted frustoconical shape opened at the upper and lower ends. The hopper 1 includes a conical body 5 provided inside the peripheral side wall 4 and coaxially therewith. The lower open end of the peripheral side wall 4 is separated from the conical body 5 to define an annular discharge port 6 therebetween. Preferably, the degree of inclination ($\alpha$) of the tapered surface of the conical body 5 relative to a vertical axial plane in section is arranged to be smaller than that ($\beta$) of the peripheral side wall 4 of the inverted frusto-conical shape.

In such an arrangement of the present hopper, solid material such as coal, coke or other mineral material is stored in an annular valley-like space defined between the peripheral side wall 4 and the conical body 5. When desired, the solid material in the hopper 1 is discharged outside thereof through the annular discharge port 6 by operating a control device and a conveyor device provided below the hopper 1, which will be discussed hereinafter in detail.

As will be understood from the description set forth above, since the discharge port 6 of the present hopper 1 is annular in shape, the stocked material cannot form a dome shaped bridge in the hopper, which bridge is formed in the conventional inverted conical hopper to block the free flow of the stocked material. The stocked material in the present hopper may have a chance to form a short bridge over a part of the annular discharge port 6 between the peripheral side wall 4 and the conical body 5. However, such bridge cannot be formed continuously all over the annular discharge port. That is, even if a short bridge is partially formed over the discharge port 6, the bridge will be broken immediately by the continuous flow of the stocked material through the non-bridged part of the annular discharge port.

In the preferred structure in which the angle of inclination ($\alpha$) of the tapered surface of the conical body 5 is smaller than the angle of inclination ($\beta$) of the peripheral side wall 4, the flow speeds of the solid material along them are different from each other, so that the possibility of forming a bridge in the present hopper is much reduced.

Furthermore, campared with the conventional inverted conical hopper, the present hopper has an inverted frusto-conical shape, so that the depth of the present hopper is very small. Accordingly, the housing of the silo containing the present hopper can be smaller in height, and the dead space below the present hopper can be relatively reduced. Also, the supporting structure for the present hopper can be simplified because of the reduced height of the hopper.

Reference is now made to a second embodiment of the present invention shown in FIGS. 3 and 4. In this embodiment, a hopper 1a is also provided in a cylindrical housing 2a of a silo 3a. The hopper 1a comprises a peripheral side wall 4a of an inverted frusto-conical shape which has relatively large diameters at the upper and lower open ends. Provided inside the peripheral side wall 4a of the hopper is an annular ridge-shaped tapered body 7 defined by walls having upwardly converging annular inclined surfaces and in which a conical body 5a is also provided. The tapered body 7 and the conical body 5a are arranged to be concentric with the peripheral side wall 4a. The conical body 5a and the annular tapered body 7 define an annular valley-like first space 8 therebetween and an annular first discharge port 6a below the space 8. Likewise, the peripheral side wall 4a and the tapered body 7 define an annular valley-like second space 9 therebetween and an annular second discharge port 6b of large diameter below the second space 9. Although not shown in FIGS. 3 and 4, conveyor devices are provided respectively below the first and second discharge ports 6a and 6b.

The hopper 1a according to the second embodiment is very advantageous for storing a great amount of solid materials, because the height of the hopper 1a is very small comparing with the conventional inverted conical hopper. Other than the above advantage, the hopper 1a of the present embodiment has the same advantages as that of the first embodiment, such as no possibility of forming bridges of the solid material all over the first and second discharge ports 6a and 6b.

Figure 6:
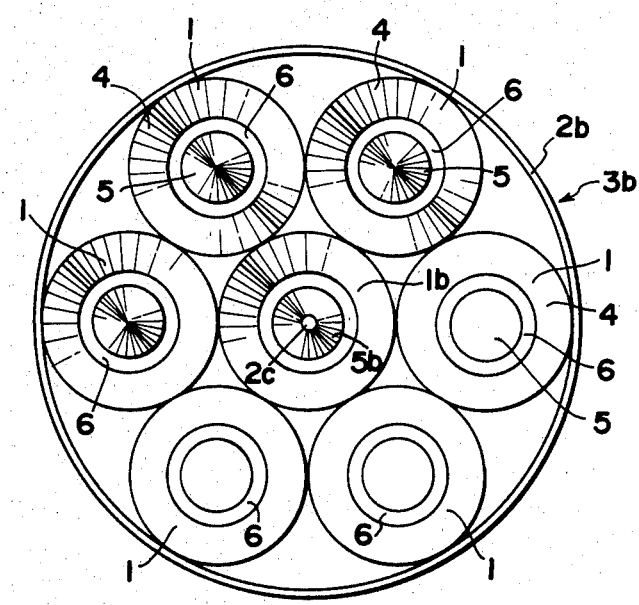
FIG. 6 is a plan view of the silo shown in FIG. 5.

Referring now to a third embodiment of the present invention shown in FIGS. 5 and 6, a silo 3b is provided in which six hoppers 1 of the same structure as set forth above regarding the first embodiment are arranged along the inner periphery of the housing 2b. Also, a hopper 1b at the center part of the housing 2b is penetrated therethrough by a supporting column 2c of the silo 3b. Accordingly, a conical body 5b of the central hopper 1b is truncated but can function in the same manner as the other conical bodies 5 in the peripheral hoppers 1. A silo of this type can be used to store a great amount of solid materials while having a relatively low height. Each hopper 1 of this embodiment also has the same advantages as set forth above regarding the first embodiment, so that a detailed description of this embodiment will not be necessary.

Reference is now made to a device for controlling the amount of the solid material to be discharged from the hopper to the outside thereof and conveying the discharged solid material to a desired location. In the hopper of the present invention, an annular discharge port 6 or 6a is formed instead of a conventional circular discharge port. Accordingly, the amount of the solid material to be discharged through the annular port 6 or 6a of the present hopper can be much greater than that discharged through the circular port of the conventional hopper. In this connection, it becomes necessary in the present hopper to accurately control the amount of the solid material discharged as desired.

Figure 7:
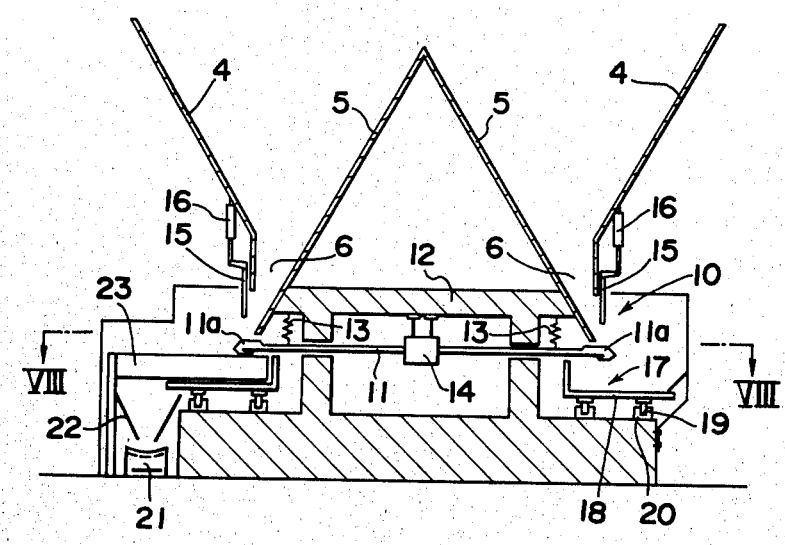
FIG. 7 is a sectional front view showing a preferred structure of a control device and a conveyor device provided below the hopper of the present invention.
Figure 8:
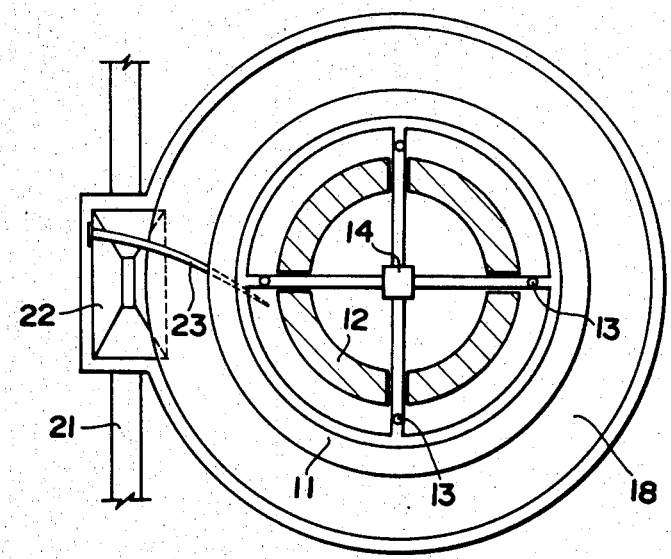
FIG. 8 is a sectional plan view taken along line VIII—VIII in FIG. 7.

A preferred structure of a device for controlling the amount of the solid material discharged is shown in FIGS. 7 and 8. The control device 10 is provided below the present hopper 1 which, as shown in FIG. 7, comprises the peripheral wall 4 of inverted frusto-conical shape and the conical body 5 to define the annular discharge port 6 therebetween, with the lower end of conical body 5 extending downwardly below the lower end of wall 4, thereby defining an inclined extension. The control device 10 comprises an annular plate 11, which extends horizontally beyond the lower end of the conical body 5 such that the peripheral edge 11a thereof is located directly below the annular discharge port 6. The annular plate 11 is suspended from an annular frame 12 in the conical body 5 by means of springs 13 and a vibrator 14, so that the annular plate 11 is vibrated by actuation of the vibrator 14. The control device 10 further comprises an annular gate member 15 provided around the annular discharge port 6 and suspended from the lower end portion of the peripheral side wall 4. The gate member 15 is made to be moved up and down by a driving device such as oil cylinders 16, so that the discharge port 6 above the annular plate 11 can be opened and closed by the gate member 15. The gate member 15 need not be a continuous annular plate but may be formed from a plurality of divided plates.

Provided below the annular plate 11 is a conveyor device 17 which comprises an annular table feeder 18. The table feeder 18 has rollers 19 at the bottom thereof which roll on annular rails 20 on a base frame, so that the annular table feeder 18 can rotate about the axis thereof. The conveyor device 17 further comprises a belt conveyor 21 provided below but adjacent to the outer periphery of the annular table feeder 18 in the tangential direction thereof. Provided above the belt conveyor 21 is a guide frame 22 and a scraper 23 by which the solid material carried by the rotating annular table 18 is collected on the belt conveyor 21.

Reference is now made to the operation of the control device 10 and the conveyor device 17. When the gate member 15 is at the lower position, there is a small annular clearance between the lower end of the gate member 15 and the annular plate 11. However, the clearance is blocked by the stocked material in the present hopper 1. At this time, when the annular plate 11 is vibrated by actuation of the vibrator 14, the blockage of the clearance is released and the stocked material starts flowing downwardly through the annular discharge port 6 along the inclined path of the extension. The amount of the material to be discharged through the annular port 6 can be increased and controlled by elevating the gate member 15 as desired. The solid material discharged through the annular port 6 is then received upon the annular table feeder 18 which is rotating along the annular rails 20 on the base frame. By the rotation of the annular table feeder 18, the solid material thereon is carried to the position of the scraper 23. The solid material collides against the scraper 23 and is diverted thereby to outside of the table and then is collected on the belt conveyor 21 through the guide frame 22. The belt conveyor 21 is continuously running and carries the solid material thereon to a predetermined remote location.

Figure 9:
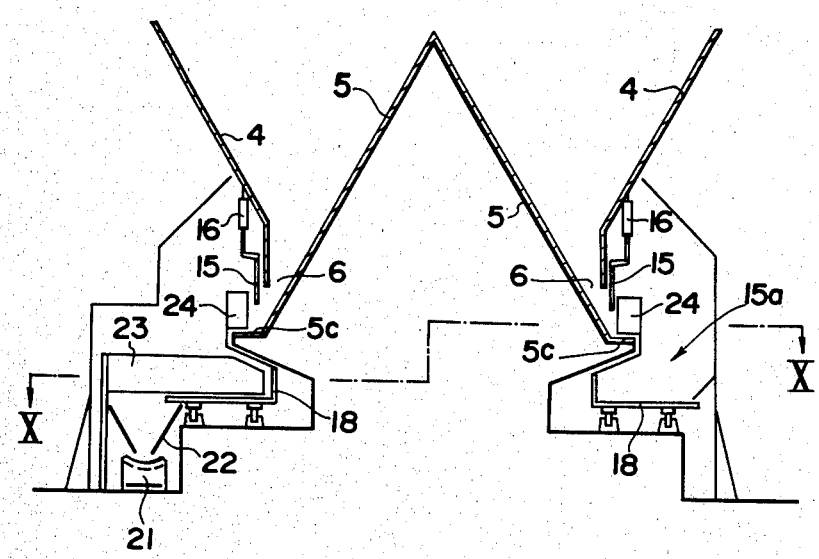
FIG. 9 is a sectional front view showing another preferred structure of a control device and a conveyor device provided below the hopper of the present invention.
Figure 10:
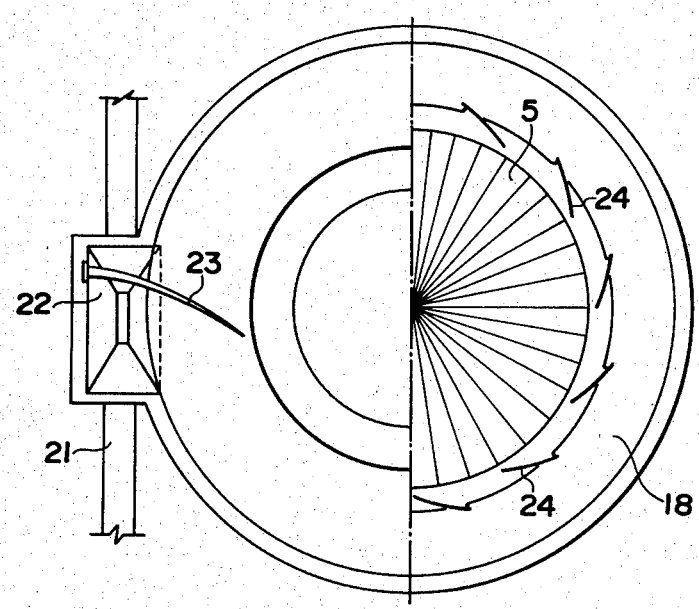
FIG. 10 is a sectional plan view taken along line X—X in FIG. 9.

Another preferred device 15a for controlling the amount of the solid material to be discharged from the present hopper 1 is shown in FIGS. 9 and 10. In this control device 15a, instead of the vibratory annular plate 11 in FIGS. 7 and 8, the lower end of the conical body 5 is extended in the horizontal direction to form an annular shelf 5c. The control device 15a further comprises a number of blades 24 which are inclined circumferentially and which are connected to the rotatable annular table feeder 18 and lying upon the annular shelf 5c of the conical body 5. Other structures of the device shown in FIGS. 9 and 10 are substantially the same as those described with reference to FIGS. 8 and 9.

In operation, when the annular table feeder 18 is rotated, the blades 24 are also rotated together with the table feeder 18 and, therefore, wedge or force out the solid material on the shelf 5c to allow the flowing of the stocked solid material through the annular discharge port 6. Then, the discharged solid material is received on the table feeder 18 and is collected on the conveyor belt 21 in the same way as set forth above with reference to FIGS. 7 and 8.

Although many modifications and alterations may be made to the device for controlling the discharge amount, the present devices shown in FIG. 7 through FIG. 10 have an advantage in the gate structure thereof. That is, since the gate member 15 is arranged to be moved up and down to open and close the discharge port 6, the gate member 15 does not receive high vertical pressure of the stocked material, so that large reinforcement of the gate structure is not required and that the operation of the gate member can be carried out with ease.

Other than the control device, many modifications and alterations may be made within the spirit of the present invention. For example, the conical body 5 in the present hopper can be supported not stationarily but movably to swing about the vertical axis thereof. Also, the conical body truncated by penetration of a supporting column as shown in FIGS. 5 and 6 is included in the term of "conical body" used in the present claims.

What is claimed is:

1. A hopper apparatus for the storage and controlled discharge of free-flowing solid material, said apparatus comprising:
   a peripheral side wall having an inverted frustoconical configuration with upper and lower open ends;
   a conical body positioned within said peripheral side wall and defining therewith an annular space for storage of free-flowing solid material, said conical body having a lower end;
   one of said lower ends of said peripheral side wall and said conical body extending downwardly below the other of said lower ends and defining an inclined downward extension;
   said lower ends of said peripheral side wall and said conical body defining therebetween an annular discharge port for discharging solid material from said annular space toward said extension, such that the discharged solid material flows in an inclined path along said extension;
   means for controlling the amount of said solid material to be discharged through said discharge port, said controlling means including an annular gate member mounted annularly adjacent said discharge port for vertical movement upwardly and downwardly to relatively open and close said discharge port, respectively; and
   means for conveying solid material discharged from said discharge port, said conveying means including an annular table mounted for rotation below said discharge port.

2. An apparatus as claimed in claim 1, wherein said lower end of said conical body extends downwardly below said lower end of said peripheral side wall to define said extension inclined outwardly.

3. An apparatus as claimed in claim 2, wherein said extension has an outwardly directed annular shelf, said gate member being mounted for vertical movement toward and away from said shelf to respectively close and open said discharge port.

4. An apparatus as claimed in claims 1 or 2, wherein said gate member is supported adjacent said lower end of said peripheral side wall.

5. An apparatus as claimed in claim 1, wherein said controlling means further includes an annular vibratory plate extending horizontally beyond said lower end of said conical body and beneath said discharge port, said gate member being mounted for vertical movement toward and away from said annular plate to respectively close and open said discharge plate.

6. An apparatus as claimed in claim 1, wherein said controlling means further includes a plurality of rotary scraper blades mounted at the periphery of said discharge port adjacent said gate member to scrape solid material discharged from said discharge port.

7. An apparatus as claimed in claim 6, wherein said scraper blades are mounted on said annular table for rotation therewith.

* * * * *